US011359511B2

(12) United States Patent
Dombek et al.

(10) Patent No.: US 11,359,511 B2
(45) Date of Patent: Jun. 14, 2022

(54) PIVOT FOR A SLIDING BEARING

(71) Applicant: SAFRAN TRANSMISSION SYSTEMS, Colombes (FR)

(72) Inventors: Alexis Claude Michel Dombek, Moissy-Cramayel (FR); Julie Marie Renée Lemoine, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 65 days.

(21) Appl. No.: 16/646,678

(22) PCT Filed: Sep. 12, 2018

(86) PCT No.: PCT/FR2018/052234
§ 371 (c)(1),
(2) Date: Mar. 12, 2020

(87) PCT Pub. No.: WO2019/053372
PCT Pub. Date: Mar. 21, 2019

(65) Prior Publication Data
US 2020/0277877 A1 Sep. 3, 2020

(30) Foreign Application Priority Data

Sep. 12, 2017 (FR) ...................................... 1758424

(51) Int. Cl.
*F01D 15/12* (2006.01)
*F01D 25/16* (2006.01)
(Continued)

(52) U.S. Cl.
CPC ........... *F01D 15/12* (2013.01); *F01D 25/166* (2013.01); *F16H 1/2809* (2013.01); *F02C 7/36* (2013.01);
(Continued)

(58) Field of Classification Search
None
See application file for complete search history.

(56) References Cited

U.S. PATENT DOCUMENTS 5,102,379 A * 4/1992 Pagluica ............... F16H 1/2836
475/159
5,391,125 A * 2/1995 Turra .................... F16H 1/2836
475/331
(Continued)

FOREIGN PATENT DOCUMENTS

| EP | 1 538 355 A1 | 6/2005 |
| EP | 2 270 361 A2 | 1/2011 |
| EP | 2 607 695 A1 | 6/2013 |

OTHER PUBLICATIONS

International Patent Application No. PCT/FR2018/052234, International Search Report and Written Opinion dated Dec. 12, 2018, 17 pgs.

*Primary Examiner* — Juan G Flores
(74) *Attorney, Agent, or Firm* — Lathrop GPM LLP

(57) ABSTRACT

A pivot for a sliding bearing of an epicyclic train includes an annular wall delimiting an axial passage, the annular wall including a first and a second annular groove opening axially in opposite directions and each defined by two coaxial inner and outer annular branches formed at the axial ends of the annular wall. The pivot also includes a plurality of first holes opening at a first end into the first annular groove and at a second opposite end into the second annular groove, these holes being made over an angular sector of between 5° and 330°.

19 Claims, 4 Drawing Sheets

(51) Int. Cl.
*F16H 1/28* (2006.01)
*F16H 57/08* (2006.01)
*F02C 7/36* (2006.01)

(52) U.S. Cl.
CPC .................. *F05D 2260/40311* (2013.01); *F16C 2360/23* (2013.01); *F16H 2057/085* (2013.01)

(56) References Cited

U.S. PATENT DOCUMENTS

| | | | | |
|---|---|---|---|---|
| 6,964,155 B2 * | 11/2005 | McCune | ............ | F02C 7/36 |
| | | | | 384/297 |
| 7,662,059 B2 * | 2/2010 | McCune | ............ | F01D 25/20 |
| | | | | 475/159 |
| 8,333,678 B2 * | 12/2012 | McCune | ............ | F01D 25/162 |
| | | | | 475/331 |
| 8,506,446 B2 * | 8/2013 | Minadeo | ............ | F16H 57/082 |
| | | | | 475/346 |
| 8,986,160 B2 * | 3/2015 | Altamura | ............ | F16H 1/2836 |
| | | | | 475/347 |
| 9,239,012 B2 * | 1/2016 | McCune | ............ | F01D 25/164 |
| 9,982,771 B2 * | 5/2018 | Muldoon | ............ | F16H 57/0479 |
| 10,066,734 B2 * | 9/2018 | Sheridan | ............ | F16H 57/0486 |
| 10,526,909 B2 * | 1/2020 | McCune | ............ | F02K 3/06 |

\* cited by examiner

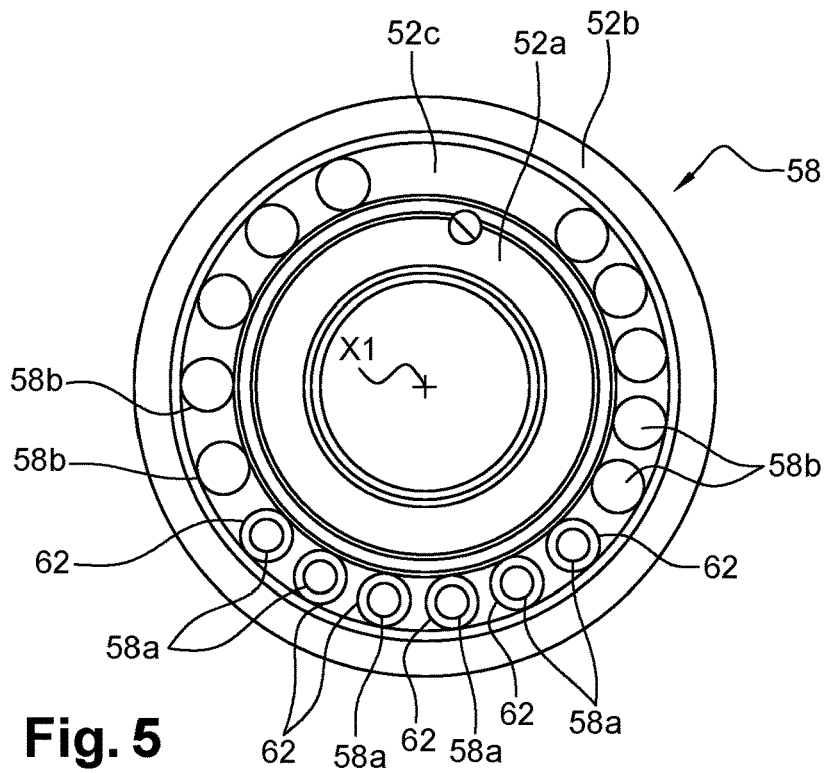
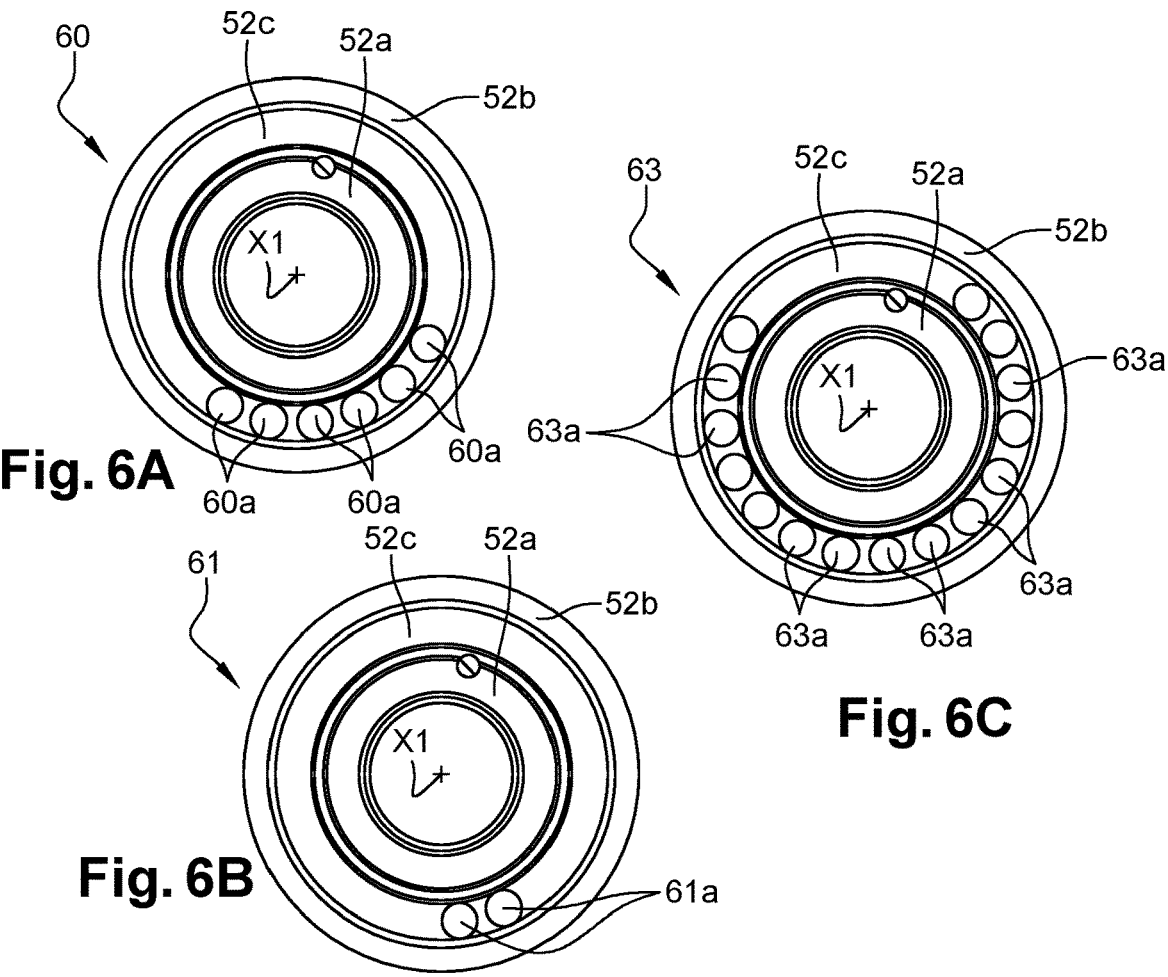

PIVOT FOR A SLIDING BEARING

CROSS-REFERENCE TO RELATED APPLICATIONS

This application is a 35 U.S.C. § 371 filing of International Application No. PCT/FR2018/052234 filed Sep. 12, 2018, which claims the benefit of priority to French Patent Application No. 1758424 filed Sep. 12, 2017, each of which is incorporated herein by reference in its entirety.

FIELD OF THE INVENTION

The present invention concerns a pivot for a sliding bearing and more particularly a pivot intended to be integrated in an epicyclic gear train of a turbine engine such as a turbojet or turboprop engine.

BACKGROUND OF THE INVENTION

Classically an epicyclic gear train consists of planetary pinions meshing with an outer ring gear and a central pinion. The planetary gears are carried by a planetary carrier and mounted freely rotatably on pivots. Such an epicyclic gear train can be used in particular for the power transmission from a drive shaft such as the shaft of a low-pressure compressor connected to the central pinion, to a blower wheel connected to the planetary carrier. The use of a pivot forming a sliding bearing with a satellite pinion reduces space and weight and offers an almost infinite service life in comparison with a ball bearing, provided that they are constantly supplied with lubricating and cooling oil.

Each pivot is formed by an annular wall delimiting an axial passage and comprising a first and a second annular groove opening axially in opposite directions. Each groove is delimited by two coaxial inner and outer annular legs formed at the axial ends of the annular wall. The inner and outer branches of each groove provide flexibility at the axial ends of the pivot, thus limiting the deformation of the pivot and thus ensuring good radial alignment of the planetary pinion teeth with the central pinion and outer ring gear. However, non-identical misalignments were observed between upstream and downstream spans of the same pivot. Tangential displacements, due to applied torques, and/or radial displacements, due to centrifugal force, and not symmetrical between upstream and downstream along the axis of rotation X, were observed on pivots. Obviously, this is harmful as it can affect the reliability of the pivot and the efficiency of the bearing and consequently on that of the gear train.

SUMMARY OF THE INVENTION

The present invention relates to a pivot for a sliding bearing of an epicyclic train, comprising an annular wall delimiting an axial passage and comprising a first and a second annular groove opening axially in opposite directions and each delimited by two coaxial inner and outer annular branches formed at the axial ends of the annular wall, characterised in that it comprises a plurality of first holes opening at a first end into the first annular groove and at a second opposite end into the second annular groove, these holes being produced over an angular sector of between 5° and 330°.

According to the invention, by making holes in a given angular sector, more flexibility can be provided in this angular sector of the pivot compared to the rest of the pivot, which allows greater local deformation of the pivot.

When the pivot is integrated into an epicyclic gear train, it is thus possible to achieve a better alignment of the planetary pinion teeth in mesh with the internal and external planetary pinion teeth. Indeed, in a sliding bearing devoid of holes as in the invention, the upstream and downstream sides of the sliding bearing are deformed differently, which leads to a misalignment of the teeth with respect to the axis of the epicyclic gear train in which the sliding bearing is mounted. By adding flexibility to a given angular sector of the bearing, the bearing is less deformed. This allows the deformations to be balanced between the upstream and downstream sides of the bearing and leads to a better alignment of the teeth in relation to the axis of the gear train.

Pivot holes can be made by a simple drilling operation, which is easy to perform.

Another feature is that a counterbore is provided at the mouth of at least one of the first and second ends of each of the first holes.

According to a first variant, the first holes are substantially straight. In a second variant, the first holes are inclined in relation to the axis of the axial passage, preferably at an angle of between 0° and 30°. This second variant makes it possible to better distribute the circumferential deformation of the pivot created by the addition of the holes compared to the first variant. In addition, it also allows for a greater reduction in mass since each hole has a greater length than in the first variant with a constant number of holes and identical diameters.

According to another characteristic of the invention, second holes can be distributed on either side of the first holes and open at a first end into the first groove and at a second end into the second groove, the second holes having dimensional characteristics different from the dimensional characteristics of the first holes. These second holes lighten the weight of the pivot.

The invention also relates to an epicyclic train of an aircraft gas turbine engine, comprising an outer ring gear and planetary pinions meshing with the central pinion and with the outer ring gear and each mounted free to rotate on a planetary carrier, the planetary pinions each being rotatable about a planetary axis via a pivot as described above, the axis of the pivot being coaxial with the axis of the planetary pinion.

Also, the invention relates to an aircraft gas turbine engine comprising a gear train, the central pinion of which surrounds and is rotationally integral with a compressor shaft of the turbine engine. More specifically, the outer ring can be attached to a static casing or shroud of the low-pressure compressor. In this configuration, the epicyclic gear train forms a reduction gear since the speed of rotation of the planetary carrier is lower than that of the central pinion.

Of course, the invention is also applicable to epicyclic gear trains such as, for example, epicyclic gear trains in which the outer ring gear is also rotatable.

The invention is further applicable to an epicyclic gear train in which the planetary carrier is fixed and the outer ring gear is movable. This type of assembly is also known as planetary reduction gear.

The invention will be better understood and other details, characteristics and advantages of the invention will appear when reading the following description, which is given as a non-limiting example, with reference to the attached drawings.

BRIEF DESCRIPTION OF THE FIGURES

FIG. 5 is a schematic view of a first embodiment;

FIGS. 6A, 6B and 6C are schematic views of several variants of a second embodiment;

DETAILED DESCRIPTION

Figure 1:
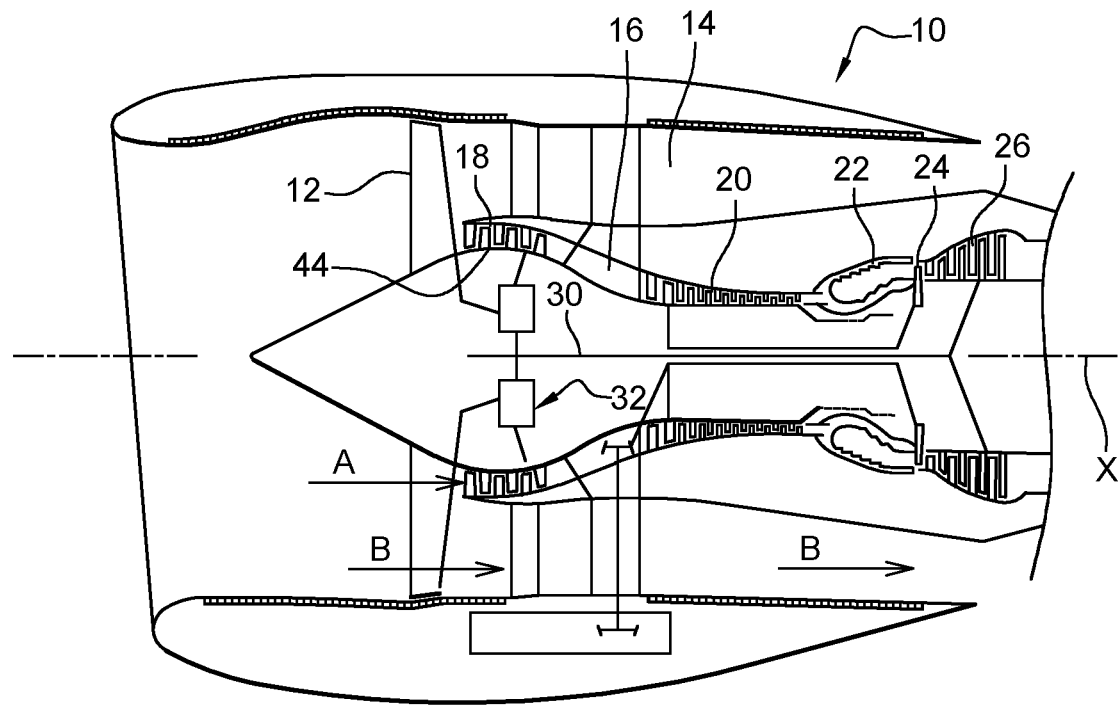
FIG. 1 is a schematic view, in perspective, of a turbine engine according to the known technique.
Figure 2:
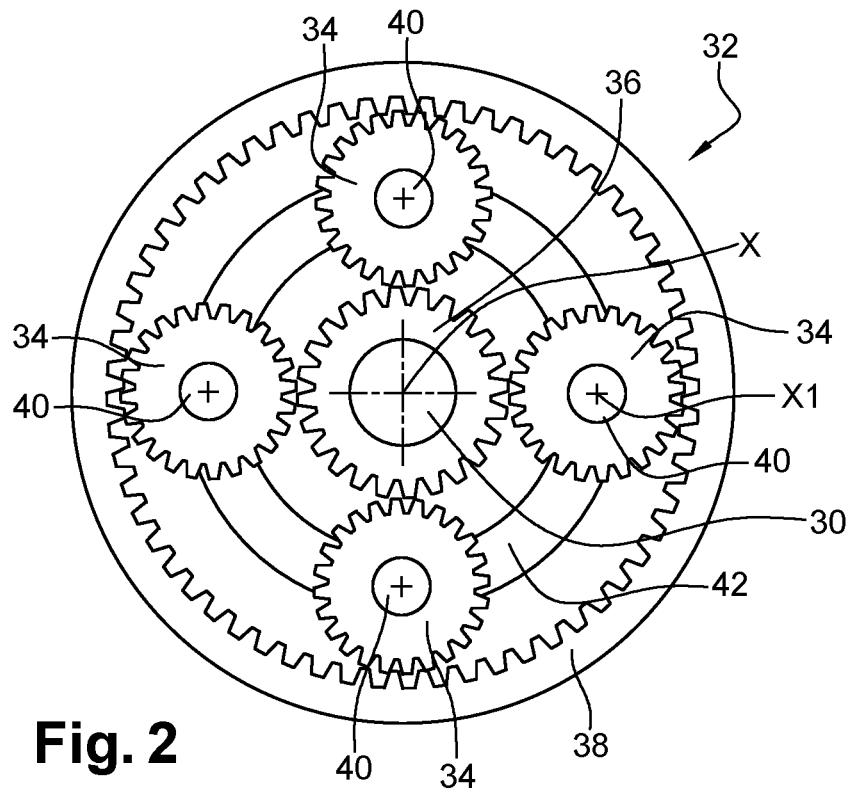
FIG. 2 is a cross-sectional schematic view of an epicyclic gear train intended to be used in a turbine engine of FIG. 1.

Reference is made first of all to FIG. 1, which shows a schematic view of a turbine engine 10, as known, comprising in an upstream-downstream direction, a fan wheel 12 whose rotation induces acceleration of air in an annular secondary air path 14 (air flow B) surrounding successively an annular primary air path 16 (air flow A) flowing into a low-pressure compressor 18, a high-pressure compressor 20, an annular combustion chamber 22, a high-pressure turbine 24 and a low-pressure turbine 26. Classically, the low-pressure turbine 26 rotates the rotor 30 of the low-pressure compressor, which is connected to the fan wheel 12. However, in order to limit the rotational speed of the fan wheel 12 in relation to the rotational speed of the rotor 30 of the low-pressure compressor 18, it is known to mount an epicyclic gear train 32 radially inside the low-pressure compressor 18, this epicyclic gear train 32 being referred to as a reduction gear due to its rotational speed-reducing function.

Such a gear train 32 comprises planetary pinions 34 meshing with an inner sun gear 36 or central pinion and with an outer sun gear 38 or outer ring gear, the inner sun gear 36 and outer ring gear 38 being coaxial to the X axis of the turbine engine. Each satellite pinion 34 is mounted freely rotatable around a pivot 40 and the pivots 40 are integral with a planetary carrier 42. In an epicyclic reduction gear, the central pinion 36 is rotationally rigidly connected to the shaft 30 of the low-pressure compressor 18 which forms an input of the gear train, the planetary carrier 42 rigidly connected to the fan wheel 12 forms an output for reducing the speed of the epicyclic gear train and the outer ring gear 38 is rigidly connected to a casing 44 of the turbine engine internally delimiting an annular zone in which the gear train is mounted.

The invention to be further described thus applies not only to a gear train 32 of the reduction gear type but also to a gear train in which the outer ring gear 38 is rotatably connected to a second fan wheel, the outer ring gear 38 and the planetary carrier being configured/sized to rotate in opposite directions.

Figure 3:
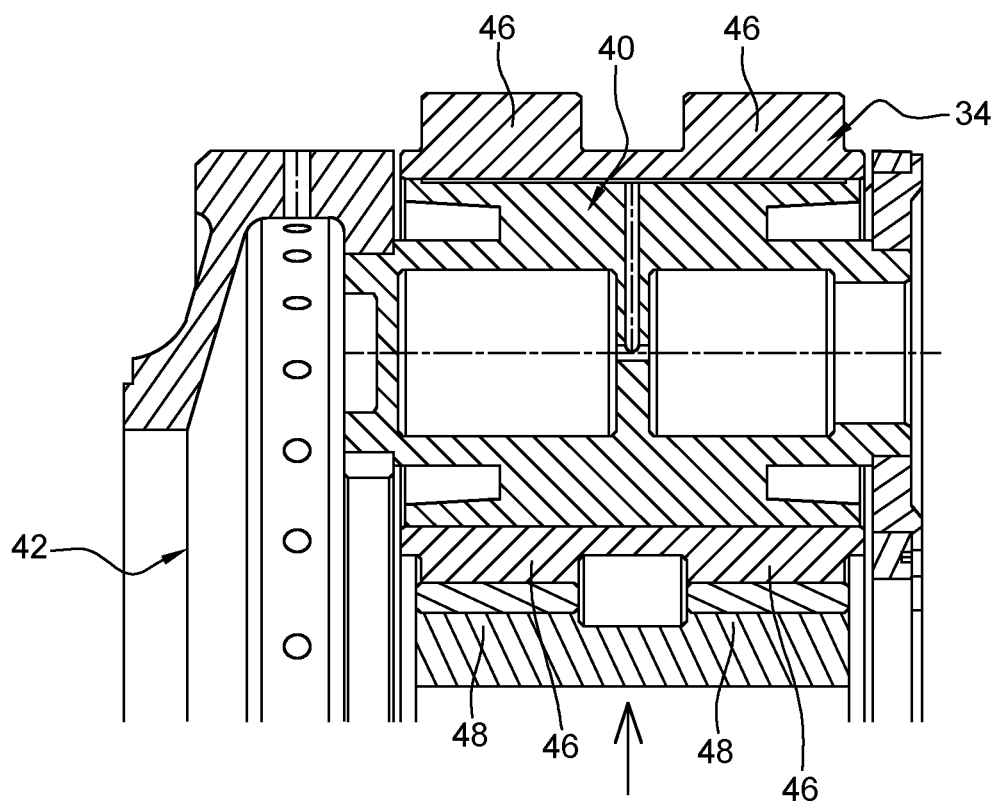
FIG. 3 is a cross-sectional schematic view of a planetary pinion and of the planetary carrier of FIG. 2.

FIG. 3 shows a sectional view of a pivot 40 around which a planetary pinion 34 is engaged to form a sliding bearing, the peripheral teeth 46 of the planetary pinion 34 being shown meshing with the peripheral teeth 48 of the central pinion 36 but not with the outer ring gear, which is not shown in this figure.

Figure 4:
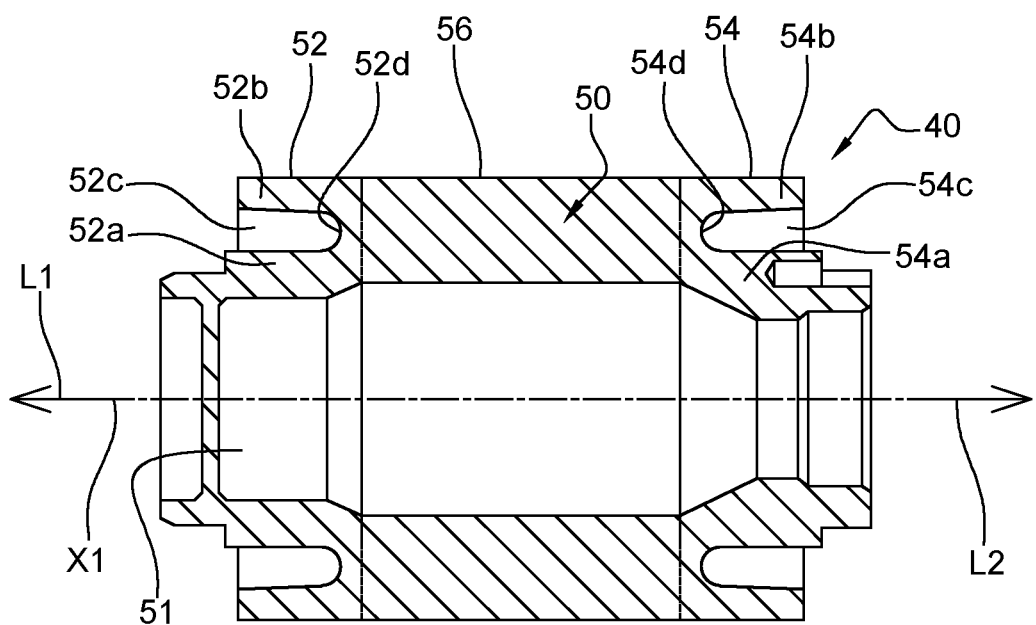
FIG. 4 is a cross-sectional schematic view of a pivot around which a planetary pinion rotates.

As is clearly visible in this figure and more specifically in FIG. 4, the pivot 40 comprises an annular wall 50 which delimits radially inwards an axial passage 51 extending along the axis X1 of the pivot. This annular wall 50 comprises a first annular part 52 end and a second annular part 54 end opposite to the first part 52 end. The first annular part 52 and the second annular part 54 are separated by an intermediate or spacing annular part 56. The first annular part 52 comprises two coaxial radially inner annular branches 52a and outer annular branches 52b delimiting a first groove 52c or annular groove opening in a first direction L1 of the axial direction X1. In addition, the second annular part 54 comprises two coaxial radially inner annular branches 54a and outer annular branches 54b delimiting a second groove 54c or annular groove opening in a second direction L2 of the axial direction X1. In FIG. 4, the radially inner branch 52a of the first annular part 52 and the radially inner branch 54a of the second annular part 54 extend axially over a greater distance, respectively, than the radially outer branch 52b of the first annular part 52 and the radially outer branch 54b of the second annular part 54. The radially inner branches 52a, 54a and outer branches 52b, 54b of each of the first annular part 52 and second annular part 54 provide flexibility to the pivot during operation. However, as already mentioned previously, such a pivot 40 can be subjected to radial and tangential forces which can lead to misalignments of the planetary pinion teeth with the internal and external planetary gear teeth.

To this end, it is proposed, as shown in FIGS. 5 and 6, in two embodiments of a pivot 58, 60, to realize a plurality of first holes 58a, 60a in the massive part of the pivot 58, 60. The first holes 58a, 60a open at a first end into the first groove 52 through its bottom wall 52d and at a second opposite end into the second groove 54 in its bottom wall 54d. These first holes 60a, 60b are formed over a given angular sector corresponding to the one where it is desired to increase the circumferential deformation of the pivot in order to compensate for a circumferentially non-uniform deformation as in the previous technique.

In the invention, the angular sector comprising first holes 58a, 60a is between 05° and 330°. Preferably, the angular sector comprising first holes 58a, 60a is between 180° and 330°, so as to minimise the mass of the pivot 58, 60. In the example shown in FIG. 5, the angular sector extends over approximately 90° to 100°.

Note that in the first embodiment of FIG. 5, the first holes include a counterbore 62 formed at the mouth of the first end of the first holes 58a of pivot 58. A counterbore 62 can also be formed at the outlet of the second ends of the first holes 58a of pivot 58. Pivot 58 of this construction also includes second holes 58b which have a larger diameter than the first holes 58a, these second holes 58b being distributed on either side of the angular sector of the first holes 58a. These second holes 58b reduce the total weight of pivot 58. Note that an angular sector of pivot 58 is devoid of second holes to avoid interference with radial or axial oil flow channels.

A second embodiment is shown in FIGS. 6A, 5B and 6C. Note that in these figures, pivot 60, 61, 63 has no second holes. However, second holes could also be formed on either side of the first holes 60a, 61a, 63a.

In FIG. 6A, pivot 60 has first holes 60a over an angular sector of approximately 90°. In FIG. 6B, pivot 61 has first holes 61a over an angular sector of approximately 5°. In FIG. 6C, pivot 63 has first holes 63a over an angular sector of approximately 330°.

The first holes 58a, 60a, 61a, 63a are here substantially straight and parallel to the X1 axis of pivot 58, 60, 61, 63.

However, these first holes 58a, 60a, 61a, 63a could also be straight but form a non-zero angle with axis X1 which can be between [0°, 30°].

Figure 7:
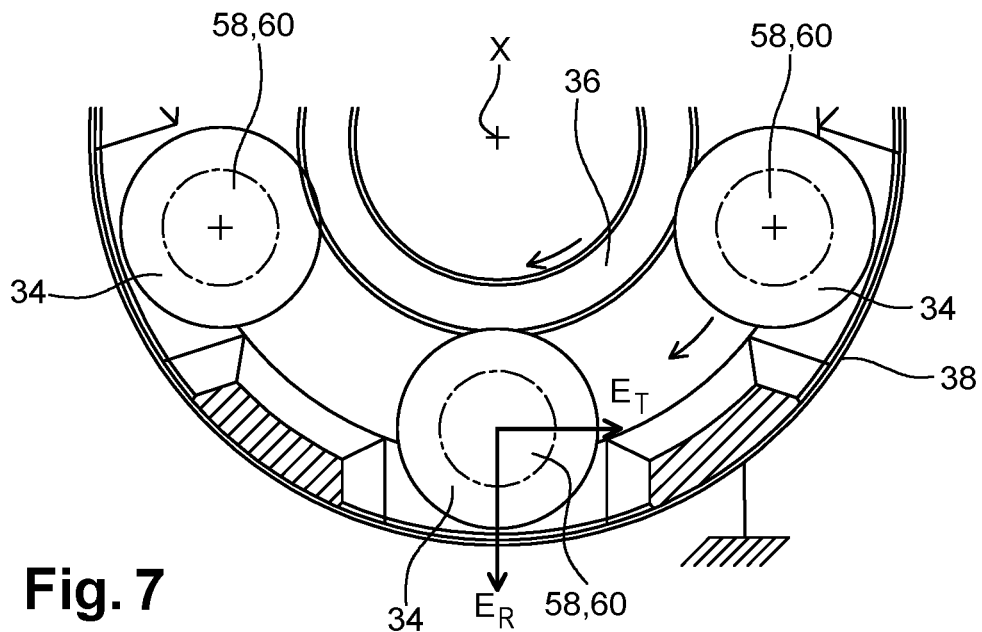
FIG. 7 is a schematic diagram of pivot mounting in an epicyclic reduction gear configuration.

FIG. 7 shows the case of an assembly of pivots 58, 60 in a speed reducer configuration, i.e. in a case where the central pinion 36 is mobile, but the outer ring gear 38 is fixed, integral with an outer casing, or a static annular shroud 26 of the compressor as in FIG. 1, in particular the low-pressure compressor 18. As illustrated, efforts both tangential ET due to the applied torque and radial ER due to centrifugal force are exerted on each pivot 58, 60.

The annular walls 52 of the pivots 58, 60, 61, 63 can be advantageously formed in one piece so that the first part 52, the intermediate part 56 and the second part 54 are formed in one piece.

Figure 8:
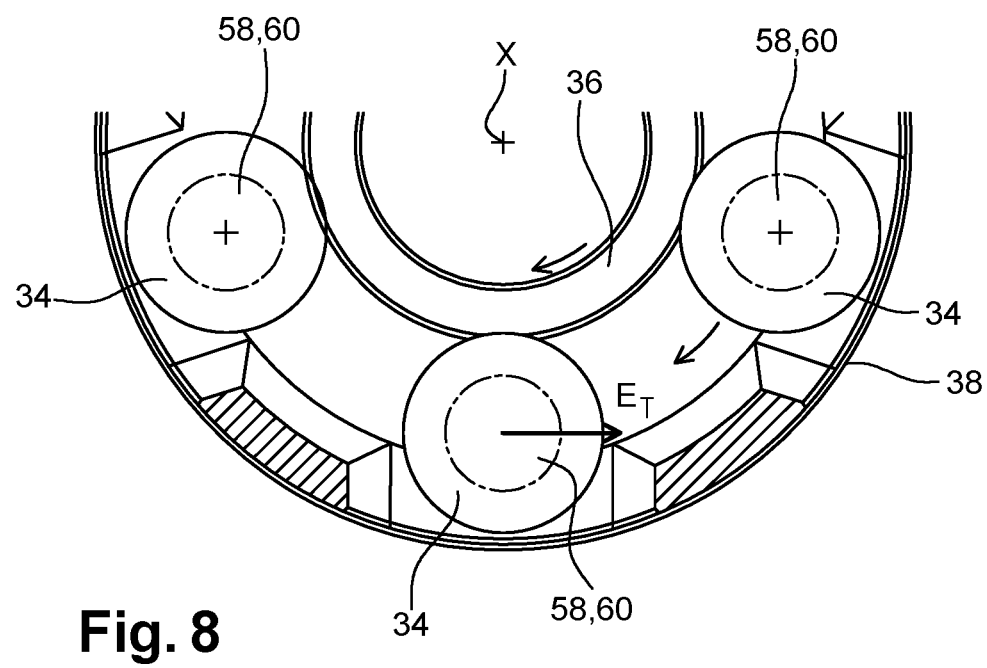
FIG. 8 is a schematic diagram of pivot mounting in a differential configuration.

In FIG. 8, another application case is shown, of a mounting of pivots 58, 60, 61, 63 in a planetary configuration, i.e. in a case where both the central pinion 36 and the outer ring gear 38 are rotatable around the X axis of the compressor, in particular of the low-pressure compressor 18. As illustrated, tangential forces ET due to the applied torques, are exerted on each pivot 58, 60, 61, 63. This situation can be that of an open-rotor or a double fan.

The invention claimed is:

1. Pivot for a sliding bearing of an epicyclic train, comprising an annular wall delimiting an axial passage and comprising a first and a second annular grooves opening axially in opposite directions, the first and second annular grooves being delimited by two coaxial inner and outer annular branches formed at axial ends of the annular wall, characterised in that the pivot comprises a plurality of first holes, each first hole of the plurality of first holes opening at a first end of the first hole into the first annular groove and at a second opposite end of the first hole into the second annular groove, the plurality of first holes being produced over an angular sector between 5° and 330°.

2. Pivot according to claim 1, the plurality of first holes being produced over an angular sector between 180° and 330°.

3. Pivot according to claim 1, wherein a counterbore is provided at the opening of at least one of the first end and the second opposite end of each of the plurality of first holes.

4. Pivot according to claim 3, wherein the plurality of first holes are inclined relative to an axis of the axial passage.

5. Pivot according to claim 3, in which the pivot comprises second holes distributed on either side of the plurality of first holes, each second hole opening at a first end of the second hole into the first annular groove and at a second end of the second hole into the second annular groove, the second holes having dimensional characteristics different from the dimensional characteristics of the plurality of first holes.

6. Epicyclic train of an aircraft gas turbine engine, comprising an outer ring gear and planetary pinions meshing with a central pinion and with the outer ring gear, each of the planetary pinions being mounted for free rotation on a planetary carrier, each planetary pinion being rotatable about a planetary axis via a pivot according to claim 3 which is coaxial with the axis of the planetary pinion.

7. Pivot according to claim 1, wherein the plurality of first holes are substantially straight.

8. Pivot according to claim 7, wherein the plurality of first holes are inclined relative to an axis of the axial passage.

9. Pivot according to claim 7, in which the pivot comprises second holes distributed on either side of the plurality of first holes, each second hole opening at a first end of the second hole into the first annular groove and at a second end of the second hole into the second annular groove, the second holes having dimensional characteristics different from the dimensional characteristics of the plurality of first holes.

10. Epicyclic train of an aircraft gas turbine engine, comprising an outer ring gear and planetary pinions meshing with a central pinion and with the outer ring gear, each of the planetary pinions being mounted for free rotation on a planetary carrier, each planetary pinion being rotatable about a planetary axis via a pivot according to claim 7 which is coaxial with the axis of the planetary pinion.

11. Pivot according to claim 1, wherein the plurality of first holes are inclined relative to an axis of the axial passage.

12. Pivot according to claim 11, wherein the plurality of first holes are inclined relative to the axis of the axial passage by an angle of between 0° and 30°.

13. Pivot according to claim 11, in which the pivot comprises second holes distributed on either side of the plurality of first holes, each second hole opening at a first end of the second hole into the first annular groove and at a second end of the second hole into the second annular groove, the second holes having dimensional characteristics different from the dimensional characteristics of the plurality of first holes.

14. Epicyclic train of an aircraft gas turbine engine, comprising an outer ring gear and planetary pinions meshing with a central pinion and with the outer ring gear, each of the planetary pinions being mounted for free rotation on a planetary carrier, each planetary pinion being rotatable about a planetary axis via a pivot according to claim 11 which is coaxial with the axis of the planetary pinion.

15. Pivot according to claim 1, in which the pivot comprises second holes distributed on either side of the plurality of first holes, each second hole opening at a first end of the second hole into the first annular groove and at a second end of the second hole into the second annular groove, the second holes having dimensional characteristics different from the dimensional characteristics of the plurality of first holes.

16. Epicyclic train of an aircraft gas turbine engine, comprising an outer ring gear and planetary pinions meshing with a central pinion and with the outer ring gear, each of the planetary pinions being mounted for free rotation on a planetary carrier, each planetary pinion being rotatable about a planetary axis via a pivot according to claim 15 which is coaxial with the axis of the planetary pinion.

17. Epicyclic train of an aircraft gas turbine engine, comprising an outer ring gear and planetary pinions meshing with a central pinion and with the outer ring gear, each of the planetary pinions being mounted for free rotation on a planetary carrier, each planetary pinion being rotatable about a planetary axis via a pivot according to claim 1 which is coaxial with the axis of the planetary pinion.

18. Gas turbine engine for aircraft comprising an epicyclic train according to claim 17, the central pinion of which surrounds and is rotationally integral with a shaft of a compressor of the gas turbine engine.

19. Gas turbine engine according to claim 18, in which the outer ring is integral with a casing or static annular shroud of a low-pressure compressor.

* * * * *